United States Patent
Kurisaka

(10) Patent No.: US 10,125,652 B2
(45) Date of Patent: Nov. 13, 2018

(54) CONTROL SYSTEM FOR INTERNAL COMBUSTION ENGINE AND CONTROL METHOD

(71) Applicant: TOYOTA JIDOSHA KABUSHIKI KAISHA, Toyota-shi, Aichi-ken (JP)

(72) Inventor: Itsuya Kurisaka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 15/220,006

(22) Filed: Jul. 26, 2016

(65) Prior Publication Data

US 2017/0051651 A1 Feb. 23, 2017

(30) Foreign Application Priority Data

Aug. 17, 2015 (JP) ................. 2015-160446

(51) Int. Cl.
| | |
|---|---|
| *F01N 3/021* | (2006.01) |
| *F01N 9/00* | (2006.01) |
| *F01N 3/08* | (2006.01) |
| *F01N 3/025* | (2006.01) |
| *F02D 41/02* | (2006.01) |

(Continued)

(52) U.S. Cl.
CPC ............. *F01N 9/002* (2013.01); *F01N 3/021* (2013.01); *F01N 3/0253* (2013.01);
(Continued)

(58) Field of Classification Search
CPC ...... F01N 13/009; F01N 3/021; F01N 3/0253; F01N 3/0814; F01N 3/0842; F01N 3/0885; F01N 3/36; F01N 9/002; F01N 2430/06; F01N 2430/085; F01N 2610/03; F01N 2900/0412; F01N 2900/08; F02B 37/007; F02D 41/025

See application file for complete search history.

(56) References Cited

U.S. PATENT DOCUMENTS

2010/0071349 A1* 3/2010 Kitazawa ............ F01N 3/2066
60/277
2010/0126148 A1* 5/2010 Morishima ........ B01D 53/9431
60/287

(Continued)

FOREIGN PATENT DOCUMENTS

EP 1555401 A1 * 7/2005 ........... F01N 3/0235
JP 2006-291823 A 10/2006

(Continued)

*Primary Examiner* — Phutthiwat Wongwian
*Assistant Examiner* — Matthew T Largi
(74) *Attorney, Agent, or Firm* — Oliff PLC

(57) ABSTRACT

A control system includes an ECU that controls supply of fuel from an addition valve and supply of fuel from an injection valve, estimates or detects a degree of end-face clogging on an exhaust-gas inflow side of a NOx catalyst, and sets an inlet temperature of the NOx catalyst by use of the fuel supplied from the injection valve to a higher level and sets an amount of the fuel supplied from the addition valve to a smaller value in a case where the degree of end-face clogging is equal to or larger than a predetermined value, compared to the case where the degree of end-face clogging is smaller than the predetermined value, when there also is a request for regeneration of an exhaust purification filter and/or a request for regeneration of the NOx catalyst.

8 Claims, 8 Drawing Sheets

(51) Int. Cl.
  *F01N 3/36* (2006.01)
  *F02B 37/007* (2006.01)
  *F01N 13/00* (2010.01)
(52) U.S. Cl.
  CPC ......... *F01N 3/0814* (2013.01); *F01N 3/0842* (2013.01); *F01N 3/0885* (2013.01); *F01N 3/36* (2013.01); *F01N 13/009* (2014.06); *F02B 37/007* (2013.01); *F02D 41/025* (2013.01); F01N 2430/06 (2013.01); F01N 2430/085 (2013.01); F01N 2610/03 (2013.01); F01N 2900/0412 (2013.01); F01N 2900/08 (2013.01); Y02T 10/144 (2013.01); Y02T 10/47 (2013.01)

(56) References Cited

U.S. PATENT DOCUMENTS

| | | | | |
|---|---|---|---|---|
| 2012/0260631 A1* | 10/2012 | Winkler | ................ | F02D 41/025 60/274 |
| 2014/0030160 A1 | 1/2014 | Inoue et al. | | |
| 2015/0176454 A1* | 6/2015 | Dreves | ................... | F01N 3/2006 60/612 |
| 2015/0337717 A1* | 11/2015 | Robinson | .............. | F02B 37/004 60/602 |
| 2015/0345357 A1 | 12/2015 | Ono | | |
| 2016/0010527 A1 | 1/2016 | Miyake | | |
| 2016/0040570 A1* | 2/2016 | Kurisaka | ............... | F01N 3/0814 60/286 |
| 2016/0290207 A1* | 10/2016 | Katayama | ............... | F01N 3/021 |
| 2016/0290218 A1* | 10/2016 | Smiljanovski | ........ | F02B 37/004 |
| 2017/0051647 A1* | 2/2017 | Iida | ....................... | F01N 3/0814 |

FOREIGN PATENT DOCUMENTS

| | | |
|---|---|---|
| JP | 2014-218982 A | 11/2014 |
| WO | 2012/140784 A1 | 10/2012 |
| WO | 2014/125620 A1 | 8/2014 |
| WO | 2014/128969 A1 | 8/2014 |

* cited by examiner

CONTROL SYSTEM FOR INTERNAL COMBUSTION ENGINE AND CONTROL METHOD

INCORPORATION BY REFERENCE

The disclosure of Japanese Patent Application No. 2015-160446 filed on Aug. 17, 2015 including the specification, drawings and abstract is incorporated herein by reference in its entirety.

BACKGROUND

1. Technical Field

The disclosure relates to a control system for an internal combustion engine and a control method.

2. Description of Related Art

Japanese Patent Application Publication No. 2006-291823 (JP 2006-291823 A) discloses an emission control system in which a NOx conversion catalyst (e.g., NOx Storage-Reduction (NSR) catalyst), and an exhaust purification filter (e.g., Diesel Particular Filter (DPF)) are mounted, in an exhaust passage of a diesel engine (which may be simply called "engine") installed on an automobile, or the like. The NOx conversion catalyst stores nitrogen oxides (NOx) contained in exhaust gas. The exhaust purification filter traps particulate matter (PM) in the exhaust gas.

In this type of engine, a fuel addition valve is provided upstream of the NOx conversion catalyst and the exhaust purification filter, and fuel can be added by means of the fuel addition valve. If the amount of NOx stored in the NOx conversion catalyst reaches a predetermined amount, the NOx stored in the NOx conversion catalyst is reduced by the fuel added from the fuel addition valve (NOx aftertreatment). When sulfur components (SOx) are adsorbed on the NOx conversion catalyst, and S poisoning occurs, rich spikes are conducted through intermittent fuel addition from the fuel addition valve. As a result, the sulfur components are removed, and the NOx storage capability of the NOx conversion catalyst is recovered (S regeneration treatment). If the amount of PM deposited on the exhaust purification filter reaches a predetermined amount, the temperature within the filter is increased to a high level through oxidation reaction of the fuel added from the fuel addition valve. As a result, the PM deposited on the exhaust purification filter is oxidized (burned) and removed (filter regeneration treatment).

SUMMARY

When deposits, or the like, are attached to an end face of the NOx conversion catalyst, and end-face clogging occurs, the NOx storage capability of the NOx conversion catalyst may deteriorate. Therefore, some treatment for eliminating end-face clogging of the NOx conversion catalyst is desired to be performed.

However, a technology of effectively performing the NOx aftertreatment or end-face clogging elimination treatment when at least one of the filter regeneration treatment and the S regeneration process is requested, while satisfying the request at the same time, has not been proposed.

The embodiments provide a control system for use in an internal combustion engine in which a NOx conversion catalyst and an exhaust purification filter are mounted in an exhaust passage, which system can effectively perform two or more of the above-described treatments.

A first aspect provides a control system for an internal combustion engine that includes an exhaust passage, a NOx conversion catalyst, an exhaust purification filter, a fuel addition valve and a fuel injection valve, the NOx conversion catalyst and the exhaust purification filter being arranged in the exhaust passage in order from an upstream side to a downstream side in a direction of flow of exhaust gas in the exhaust passage, the fuel addition valve being provided in the exhaust passage upstream of the NOx conversion catalyst and being configured to supply a fuel from an upstream side of the NOx conversion catalyst, the fuel injection valve being configured to supply the fuel into a combustion chamber of the internal combustion engine. The control system includes an electronic control unit configured to: control supply of the fuel from the fuel addition valve and supply of the fuel from the fuel injection valve; determine a degree of end-face clogging on an exhaust-gas inflow side of the NOx conversion catalyst; and when a request for regeneration of the exhaust purification filter and/or a request for regeneration of the NOx conversion catalyst is made, (A) set an inlet temperature of the NOx conversion catalyst to a first higher level by use of the fuel supplied from the fuel injection valve while setting an amount of the fuel supplied from the fuel addition valve to a first value in a case where the degree of end-face clogging is determined to be equal to or larger than a predetermined value, and (B) in a case where the degree of end-face clogging is determined to be smaller than the predetermined value, set the amount of the fuel supplied from the fuel addition valve to a second value that is larger than the first value without setting the inlet temperature of the NOx conversion catalyst to the first higher level by use of the fuel supplied from the fuel injection valve.

With the above arrangement, in the case where the degree of end-face clogging of the NOx conversion catalyst estimated or detected (determined) by the electronic control unit is equal to or larger than the predetermined value, when at least one of the request for regeneration of the exhaust purification filter and the request for regeneration of the NOx conversion catalyst is generated, the inlet temperature of the NOx conversion catalyst which is adjusted by use of the fuel supplied from the fuel injection valve is set to a first higher level (set to a higher level than that in the case where the degree of end-face clogging is smaller than the predetermined value), and the amount of the fuel supplied from the fuel addition valve is set to a first (small) value (set to a smaller value than that in the case where the degree of end-face clogging is smaller than the predetermined value). As a result, substances (such as deposits) that cause clogging at an end face of the NOx conversion catalyst (end-face clogging in an inlet portion of the NOx conversion catalyst) can be oxidized and removed. Also, since the inlet temperature of the NOx conversion catalyst is set high, the internal temperature of the NOx conversion catalyst and the temperature of exhaust gas introduced into the exhaust purification filter can be made high even if the amount of fuel supplied from the fuel addition valve is set small. As a result, the NOx conversion catalyst can be regenerated when the request for regeneration of the NOx conversion catalyst is generated, and the exhaust purification filter can be regenerated when the request for regeneration of the exhaust purification filter is generated. Thus, when the degree of end-face clogging of the NOx conversion catalyst is equal to or larger than the predetermined value, the inlet temperature of the NOx conversion catalyst is set high, and the amount of fuel supplied from the fuel addition value is set small, so that the end-face clogging elimination treatment on the NOx conversion catalyst, and at least one of the NOx conversion catalyst regeneration treatment and the exhaust purification filter regeneration treatment can be efficiently performed in parallel.

On the other hand, in the case where the degree of end-face clogging of the NOx conversion catalyst estimated or detected (determined) by the electronic control unit is smaller than the predetermined value, when at least one of the request for regeneration of the exhaust purification filter and the request for regeneration of the NOx conversion catalyst is generated, the inlet temperature of the NOx conversion catalyst which is adjusted by use of the fuel supplied from the fuel injection valve is set to a low level (set to a lower level than that in the case where the degree of end-face clogging is equal to or larger than the predetermined value), and the amount of fuel supplied from the fuel addition valve is set to a second large value (set to a larger value than that in the case where the degree of end-face clogging is equal to or larger than the predetermined value). As a result, the temperature of exhaust gas flowing into the NOx conversion catalyst can be adjusted to a temperature suitable for NOx aftertreatment (treatment for reducing NOx stored in the NOx conversion catalyst). Since the amount of fuel supplied from the fuel addition valve is set large, the internal temperature of the NOx conversion catalyst and the temperature of exhaust gas introduced into the exhaust purification filter are increased, due to oxidation reaction (combustion) of the fuel in the NOx conversion catalyst, so that the NOx conversion catalyst can be regenerated when the request for regeneration of the NOx conversion catalyst is generated, and the exhaust purification filter can be regenerated when the request for regeneration of the exhaust purification filter is generated. Thus, when the degree of end-face clogging of the NOx conversion catalyst is smaller than the predetermined value, the inlet temperature of the NOx conversion catalyst is set low, and the amount of fuel supplied from the fuel addition value is set large, so that the NOx aftertreatment on the NOx conversion catalyst, and at least one of the NOx conversion catalyst regeneration treatment and the exhaust purification filter regeneration treatment can be efficiently performed in parallel.

In the control system, the electronic control unit may be configured to adjust the inlet temperature of the NOx conversion catalyst with the fuel injection valve by adjusting a fuel injection timing and a fuel injection amount in a period from an expansion stroke to an exhaust stroke of the internal combustion engine.

With the above arrangement, the inlet temperature of the NOx conversion catalyst can be adjusted, through fuel injection control of the fuel injection valve performed independently of the operation to supply the fuel from the fuel addition valve. Namely, it is possible to adjust the inlet temperature of the NOx conversion catalyst with high accuracy, by adjusting the fuel injection timing and the fuel injection amount from the fuel injection valve. Therefore, the inlet temperature of the NOx conversion catalyst at the time when the treatment for eliminating end-face clogging of the NOx conversion catalyst is performed, and the inlet temperature of the NOx conversion catalyst at the time when the NOx aftertreatment is performed on the NOx conversion catalyst can be adjusted to respective temperatures suitable for the treatments. Consequently, the treatment for eliminating end-face clogging and the NOx aftertreatment can be performed with high efficiency.

In the control system, the internal combustion engine may further include a first turbocharger, a second turbocharger, and a flow control device. The exhaust passage may include a first exhaust passage and a second exhaust passage, on an upstream side of the NOx conversion catalyst. The first turbocharger may be provided in the first exhaust passage. The second turbocharger may be provided in the second exhaust passage, the second turbocharger having a larger physical size than the first turbocharger. The flow control device may be provided in the exhaust passage and may be configured to adjust a ratio of a first flow rate of exhaust gas flowing through the first exhaust passage to a second flow rate of exhaust gas flowing through the second exhaust passage. The electronic control unit may be configured to control the flow control device so as to make the ratio of the second flow rate to the first flow rate larger in the case where the degree of end-face clogging is determined to be equal to or larger than a predetermined value, than the ratio of the second flow rate to the first flow rate in the case where the degree of end-face clogging is determined to be smaller than the predetermined value, when the request for regeneration of the exhaust purification filter and/or the request for regeneration of the NOx conversion catalyst is made in a condition where a load of the internal combustion engine is equal to or smaller than a prescribed value.

With the above arrangement, when at least one of the request for regeneration of the exhaust purification filter and the request for regeneration of the NOx conversion catalyst is generated in a condition where the load of the internal combustion engine is equal to or smaller than the prescribed value, and the degree of end-face clogging of the NOx conversion catalyst is equal to or larger than the predetermined value, the ratio of the flow rate of exhaust gas flowing in the second exhaust passage is set to a large value (set to a larger value than that in the case where the degree of end-face clogging is smaller than the predetermined value). In this case, since the load of the engine is equal to or smaller than the prescribed value, the amount of work of the second turbocharger having a large physical size is small (the amount of work is small since the turbine wheel is less likely or unlikely to rotate), and the amount of heat recovered at the turbine wheel of the second turbocharger is small. Also, since the flow rate of exhaust gas flowing in the first exhaust passage is small, the amount of heat recovered at the turbine wheel of the first turbocharger is also small. Namely, the amount of heat recovered by the turbocharger as a whole can be reduced to be small. As a result, the temperature of exhaust gas flowing into the inlet of the NOx conversion catalyst can be increased, and substances that cause end-face clogging of the NOx conversion catalyst can be effectively oxidized and removed. Therefore, the end-face clogging can be effectively eliminated.

In the control system, the electronic control unit may be configured to intermittently execute supply of the fuel from the fuel addition valve at intervals of several seconds, in the case where the degree of end-face clogging is determined to be smaller than the predetermined value, when the request for regeneration of the exhaust purification filter and/or the request for regeneration of the NOx conversion catalyst is made.

Through the operation to supply the fuel from the fuel addition valve, the concentration of the fuel in exhaust gas flowing into the NOx conversion catalyst is increased, so as to produce reducing intermediates; then, the concentration of the fuel in exhaust gas flowing into the NOx conversion catalyst is reduced, and the oxygen concentration is increased, so that active NOx reacts with the reducing intermediates, and NOx is reduced and removed. The fuel addition control for the NOx aftertreatment is called "Diesel NOx Aftertreatment by Adsorbed Intermediate Reductants (Di-Air) Control". With the Di-Air control, the temperature zone in which the NOx aftertreatment is feasible can be extended to a high temperature range, and the NOx aftertreatment can be effectively performed.

A second aspect provides a control method for controlling an internal combustion engine that includes an exhaust passage, a NOx conversion catalyst, an exhaust purification filter, a fuel addition valve and a fuel injection valve, the NOx conversion catalyst and the exhaust purification filter being arranged in the exhaust passage in order from an upstream side to a downstream side in a direction of flow of exhaust gas in the exhaust passage, the fuel addition valve being provided in the exhaust passage upstream of the NOx conversion catalyst and being configured to supply a fuel from an upstream side of the NOx conversion catalyst, the fuel injection valve being configured to supply the fuel into a combustion chamber of the internal combustion engine. The control method includes: controlling supply of the fuel from the fuel addition valve and supply of the fuel from the fuel injection valve; determining a degree of end-face clogging on an exhaust-gas inflow side of the NOx conversion catalyst; and when a request for regeneration of the exhaust purification filter and/or a request for regeneration of the NOx conversion catalyst is made, the electronic control unit (A) setting an inlet temperature of the NOx conversion catalyst to a first higher level by use of the fuel supplied from the fuel injection valve while setting an amount of the fuel supplied from the fuel addition valve to a first value in a case where the degree of end-face clogging is determined to be equal to or larger than a predetermined value, and (B) in a case where the degree of end-face clogging is determined to be smaller than the predetermined value, setting the amount of the fuel supplied from the fuel addition valve to a second value that is larger than the first value without setting the inlet temperature of the NOx conversion catalyst to the first higher level by use of the fuel supplied from the fuel injection valve.

In the control system and method as described above, when at least one of the request for regeneration of the exhaust purification filter and the request for regeneration of the NOx conversion catalyst is generated, the inlet temperature of the NOx conversion catalyst and the amount of the fuel supplied from the fuel addition valve are set according to the degree of end-face clogging of the NOx conversion catalyst. Thus, two or more treatments on the NOx conversion catalyst and the exhaust purification filter can be efficiently performed in parallel.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

One embodiment will be described with reference to the drawings. This embodiment will be described using a cylinder direct injection type, multi-cylinder (e.g., in-line four-cylinder) diesel engine (internal combustion engine) of a common rail type, which engine is installed on an automobile.

Figure 1:
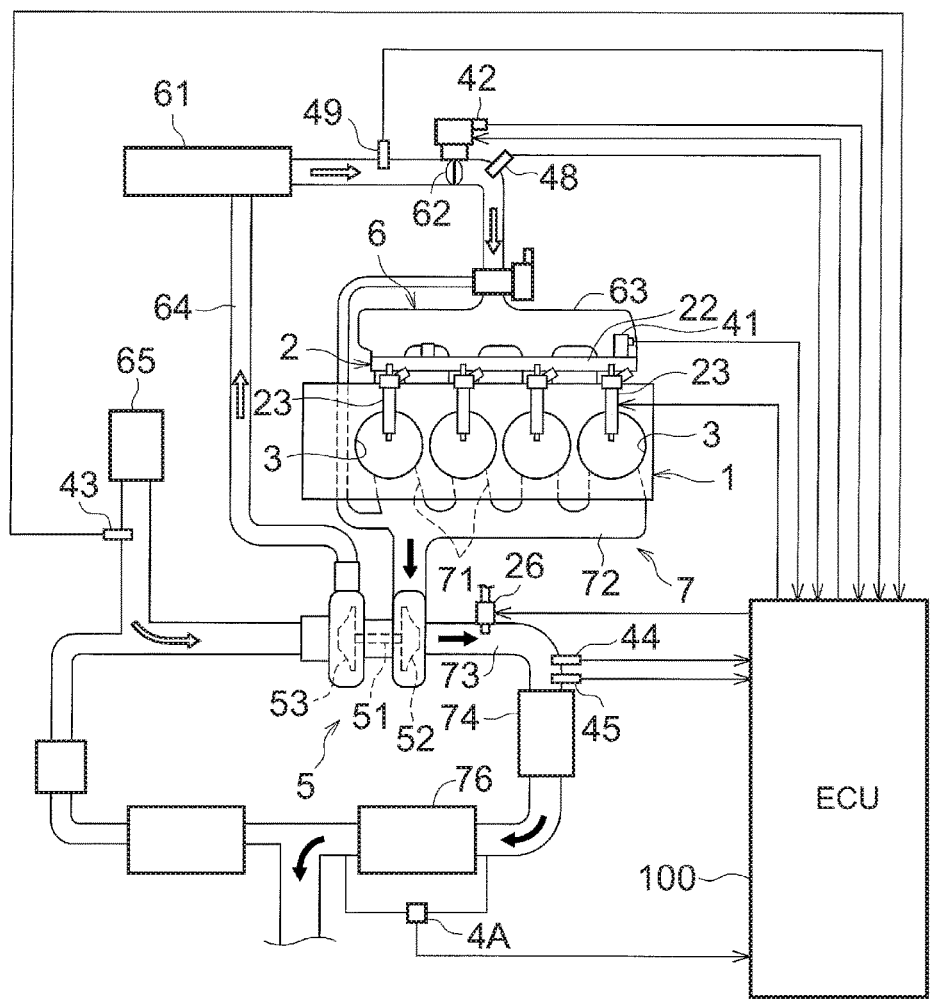
FIG. 1 is a view showing the general configuration of a diesel engine and its control system according to one embodiment.

Initially, the general configuration of the diesel engine (which will be simply referred to as "engine") according to this embodiment will be described. FIG. 1 shows the general configuration of the engine 1 and its control system according to this embodiment.

As shown in FIG. 1, the engine 1 according to this embodiment includes a fuel supply system 2, combustion chambers 3, an intake system 6, an exhaust system 7, and so forth.

The fuel supply system 2 includes a common rail 22, and injectors (e.g., fuel injection valves) 23 mounted in respective cylinders for supplying fuel into the corresponding combustion chambers 3. The common rail 22 is supplied with fuel that is pumped up from a fuel tank (not shown) such that its pressure is raised by a supply pump 21 (see FIG. 2). The fuel supplied to the common rail 22 is distributed to the respective injectors 23. Each of the injectors 23 is a piezoelectric injector or piezo injector, for example.

The supply pump 21 supplies some of the fuel pumped up from the fuel tank to a fuel addition valve 26. The fuel addition valve 26 is in the form of an electronically controlled opening/closing valve adapted to add fuel into the exhaust system 7 as needed, under fuel addition control performed by an electronic control unit (ECU) 100.

The intake system 6 includes an intake passage 64 that communicates with an intake manifold 63. In the intake passage 64, an air cleaner 65, a compressor impeller 53 of a turbocharger 5 which will be described later, an intercooler 61, and an intake throttle valve (e.g., diesel throttle) 62 are arranged in order, from the upstream side to the downstream side in a direction of flow of intake air.

The exhaust system 7 includes an exhaust passage 73 that communicates with an exhaust manifold 72 having passages 71 for each combustion chamber 3. In the exhaust passage 73, a turbine wheel 52 of the turbocharger 5, fuel addition valve 26, NSR catalyst (e.g., NOx conversion catalyst) 74, and a DPF (e.g., exhaust purification filter) 76 are arranged in order, from the upstream side to the downstream side in a direction of flow of exhaust gas. Therefore, the fuel added from the fuel addition valve 26 is supplied from the upstream side of the NSR catalyst 74, toward the NSR catalyst 74 and the DPF 76.

The NSR catalyst 74 stores NOx in exhaust gas using a NOx storage material while the air-fuel ratio (A/F) of exhaust gas is in a lean state. On the other hand, if the air-fuel ratio of exhaust gas becomes rich, the NSR catalyst 74 allows NOx released from the NOx storage material to react with reductant components, such as hydrogen ($H_2$), carbon monoxide (CO), and hydrocarbon (HC), in the exhaust gas. As a result, NOx is reduced into nitrogen $N_2$, and $H_2$, CO, HC are oxidized into water ($H_2O$) and carbon dioxide ($CO_2$). In this embodiment, the above control of the air-fuel ratio of exhaust gas is conducted through fuel addition control of the fuel addition valve 26.

The DPF 76 is a porous ceramic structure, in which front end portions and rear end portions of adjacent ones of a multiplicity of cells are alternately closed off. Exhaust gas flows into the cells whose end portions on the exhaust upstream side of the DPF 76 are open, and passes through porous walls between these cells and adjacent cells. During the passage, PM (particular matter) in the exhaust gas is trapped. The DPF 76 of this embodiment is coated with noble metal, such as platinum. During DPF regeneration treatment (e.g., filter regeneration treatment) which will be described later, the noble metal functions as an oxidation catalyst that promotes oxidation reaction of deposited PM.

The engine 1 is provided with the turbocharger (e.g., supercharger) 5.

The turbocharger 5 includes the turbine wheel 52 and compressor impeller 53 that are connected to each other by a turbine shaft 51. The turbocharger 5 performs so-called supercharging operation, by rotating the compressor impeller 53, utilizing exhaust flow (exhaust pressure) received by the turbine wheel 52, and increasing the intake pressure.

Figure 2:
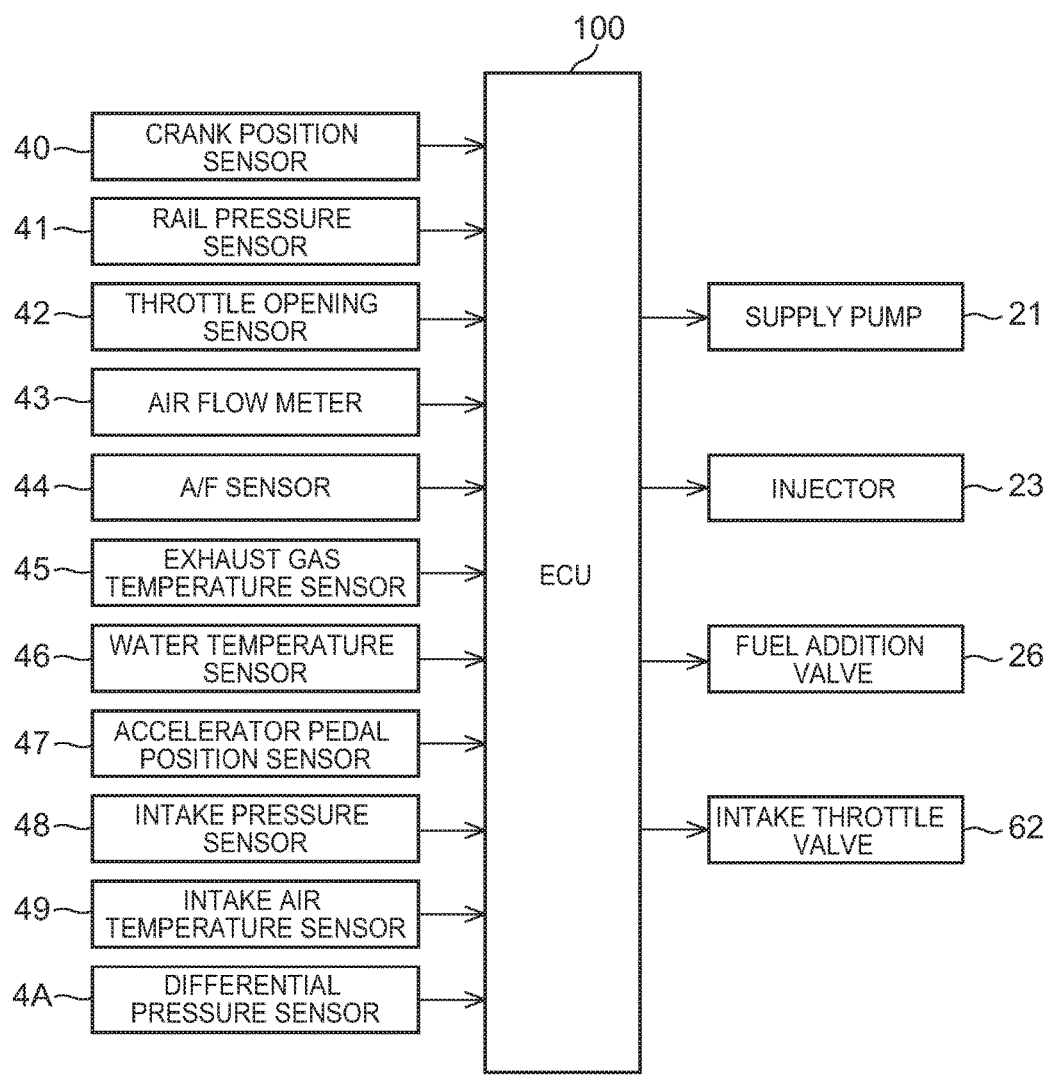
FIG. 2 is a block diagram showing the configuration of a control system including an ECU.

The ECU 100 includes a microcomputer consisting principally of CPU, ROM, RAM, etc., and input and output circuits, which are not illustrated. As shown in FIG. 2, a crank position sensor 40, rail pressure sensor 41, throttle opening sensor 42, air flow meter 43, A/F sensor 44 provided on the upstream side of the NSR catalyst 74 (on the downstream side of the fuel addition valve 26), exhaust gas temperature sensor 45 provided on the upstream side of the NSR catalyst 74 (on the downstream side of the fuel addition valve 26), water temperature sensor 46, accelerator pedal position sensor 47, intake pressure sensor 48, intake air temperature sensor 49, differential pressure sensor 4A that detects a pressure difference between the upstream-side pressure and downstream-side pressure of the DPF 76, etc. are connected to the input circuit of the ECU 100.

The above-mentioned supply pump 21, injectors 23, fuel addition valve 26, and the intake throttle valve 62 are connected to the output circuit of the ECU 100.

The ECU 100 performs various controls of the engine 1, referring to various maps stored in the ROM as needed, based on outputs from the above-indicated various sensors, and computational values obtained according to arithmetic expressions using the output values. As one example, the ECU 100 performs various controls of the engine 1, including control of fuel injection (control of the injection amount and injection timing of each of pilot injection, main injection, after injection, and post injection) by the injectors 23, and fuel addition control of the fuel addition valve 26.

Next, the outlines of the basic operations of NOx aftertreatment, S regeneration treatment, DPF regeneration treatment, and end-face clogging elimination treatment, as treatments performed on the NSR catalyst 74 and the DPF 76 in this embodiment, will be individually described. In this embodiment, two or more of these treatments are executed in parallel. Here, the execution timing, and its control, in the case where the two or more treatments are performed in parallel, will be described later.

Initially, the NOx aftertreatment will be described. In the diesel engine 1, the air-fuel ratio of exhaust gas is lean in the most part of operating region, and an ambient atmosphere of the NSR catalyst 74 has a high oxygen concentration in a normal operating state. In this condition, NOx in exhaust gas is stored in the NSR catalyst 74. Since situations where the ambient atmosphere of the NSR catalyst 74 has a low oxygen concentration are rare, the NOx storage amount gradually increases, and the NOx storage capability of the NSR catalyst 74 is reduced with the increase of the NOx storage amount.

The NOx aftertreatment is conducted by supplying fuel into exhaust gas through addition of the fuel from the fuel addition valve 26, so as to temporarily make the air-fuel ratio (A/F) rich, and increase the amounts of reductant components (such as HC). As a result, the NSR catalyst 74 is surrounded by a reducing atmosphere, and the stored NOx is released, reduced and removed, so that the NOx storage capability of the NSR catalyst 74 is recovered.

In the NOx aftertreatment of this embodiment, the fuel addition from the fuel addition valve 26 is intermittently executed at intervals of several seconds. This fuel addition operation is called "Di-Air Control". As disclosed in International Publication WO2012/140784, for example, the Di-Air control is to convert and remove NOx by intermittently executing fuel addition from the fuel addition valve 26 at intervals of several seconds, so as to temporarily increase the concentration of hydrocarbon flowing into the NSR catalyst 74, and produce reducing intermediates, and then reducing the concentration of hydrocarbon flowing into the NSR catalyst 74, so as to increase the oxygen concentration and cause active NOx to react with the reducing intermediates. With the Di-Air control, a temperature zone in which the NOx aftertreatment is feasible can be extended to a high temperature region (e.g., 450° C.), and the NOx aftertreatment can be effectively performed.

The NOx aftertreatment is basically carried out when the NOx storage amount estimated based on engine operating conditions, etc. reaches a predetermined threshold value (a predetermined value before the NOx storage capability of the NSR catalyst 74 is saturated). As a method of estimating the amount of NOx stored in the NSR catalyst 74, NOx storage amounts corresponding to engine speeds and the amounts of fuel injected from the injectors 23 are obtained in advance by experiment, or the like, and are stored in the form of a map in the ROM of the ECU 100, and the NOx storage amounts obtained according to this map are integrated, so that the NOx storage amount in the NSR catalyst 74 is estimated. In another method, NOx storage amounts corresponding to the amounts of fuel added from the fuel addition valve 26 may be obtained in advance by experiment, or the like, and stored in the form of a map in the ROM of the ECU 100, and the sum of an integrated value of the NOx storage amounts obtained according to this map, and the integrated value of the NOx storage amounts obtained according to the engine speeds and the amounts of fuel injected from the injectors 23 may be estimated as the NOx storage amount in the NSR catalyst 74.

In this embodiment, when no request for NOx aftertreatment is generated, the end-face clogging elimination treatment and/or the S regeneration treatment may be conducted, as described later. In this case, the NOx storage amount in the NSR catalyst 74 is estimated by subtracting the amount of NOx released from the NSR catalyst 74 through these treatments (the end-face clogging elimination treatment and the S regeneration treatment) (for example, by subtracting the NOx amount obtained according to a NOx amount subtraction map created in advance).

Next, the S regeneration treatment will be described. In the NSR catalyst 74, adsorption of sulfur components (SOx) takes place by the same mechanism as storage of NOx. Since SOx once adsorbed is less likely to be released and removed than NOx, the SOx is gradually accumulated in the NSR catalyst 74 without being released even if the NOx aftertreatment is performed, resulting in deterioration of the NOx storage capability of the NSR catalyst 74 (S poisoning). The amount of SOx accumulated in the NSR catalyst 74 is basically estimated, based on the total amount of fuel injected from the injectors 23 from the time when the last S regeneration treatment ends, and the sulfur concentration in the fuel.

As a method of eliminating the S poisoning, when the SOx accumulation amount reaches a predetermined amount, and a request for S regeneration treatment is generated, rich spikes are conducted by intermittently adding fuel from the fuel addition valve 26, so that the atmosphere temperature of the NSR catalyst 74 is raised to a high temperature region of about 600-700° C. As a result, barium sulfate ($BaSO_4$) adsorbed on the NSR catalyst 74 is thermally decomposed, to react with hydrocarbon (HC) and carbon monoxide (CO) in exhaust gas, and is reduced into $SO_2$, etc. in a gaseous state. Thus, the NOx storage capability of the NSR catalyst 74 is recovered.

The DPF regeneration treatment will be described. In the diesel engine 1, the PM contained in exhaust gas is trapped by the DPF 76, but the PM thus trapped accumulates on walls of cells of the DPF 76, and impedes flow of exhaust gas so that the airflow resistance gradually becomes larger.

The DPF regeneration treatment (PM regeneration treatment) is to supply fuel into exhaust gas through fuel addition from the fuel addition valve 26, so as to burn and remove the PM deposited on the DPF 76. Namely, the fuel added from the fuel addition valve 26 reaches the NSR catalyst 74 along with exhaust gas, to be oxidized, and the exhaust gas temperature rises due to heat generated through the oxidation reaction, resulting in increase of the temperature of the DPF 76. If the temperature of the DPF 76 rises to a temperature (equal to or higher than 600° C., for example) at which the PM can be burned, the PM deposited on the DPF 76 starts burning, and the temperature of the DPF 76 further rises due to heat generated through the combustion. With this condition kept for a given period of time, the deposited PM is removed, and the PM trapping capability of the DPF 76 is recovered.

The DPF regeneration treatment is basically executed when the PM deposition amount of the DPF 76 is presumed to reach a predetermined value (when a request for DPF regeneration treatment is generated). Namely, the relationship between the output signal (pressure difference) of the differential pressure sensor 4A and the PM deposition amount is stored in the form of a map in the ROM of the ECU 100, and the DPF regeneration treatment is executed when the PM deposition amount obtained from this map reaches the predetermined value.

In this embodiment, when no request for PM regeneration treatment is generated, the end-face clogging elimination treatment and/or the S regeneration treatment may be performed, as will be described later. In this case, the PM deposition amount in the DPF 76 is estimated by subtracting the amount of PM removed from the DPF 76 through these treatments (the end-face clogging elimination treatment and the S regeneration treatment) (for example, by subtracting the PM amount obtained from a PM amount subtraction map created in advance).

The end-face clogging elimination treatment will be described. If the engine 1 is kept operating in a condition where the exhaust gas temperature is relatively low (e.g., 350° C. or lower), soot and HC in exhaust gas bind together, to produce deposits, and the deposits accumulate on the NSR catalyst 74. The PM may also accumulate on the NSR catalyst 74. At this time, the deposits and the PM are deposited while being concentrated in an end-face portion of the NSR catalyst 74 on the exhaust gas inflow side (on the upstream side in the exhaust flow direction), and may cause clogging at this end face. If clogging occurs at the end face of the NSR catalyst 74 in this manner, the NOx can only be stored in a restricted region within the NSR catalyst 74, and the amount of NOx that can be stored is reduced.

The end-face clogging elimination treatment is executed when the end-face clogging rate of the NSR catalyst 74 becomes equal to or larger than a predetermined value (when a request for end-face clogging elimination treatment is generated). More specifically, after injection from the injectors 23 (fuel injection in a period from the expansion stroke to the exhaust stroke of the engine 1) is conducted, so as to increase the exhaust gas temperature on the upstream side of the NSR catalyst 74, and cause the high-temperature exhaust gas to flow into the NSR catalyst 74, so that the deposits and PM, which cause end-face clogging, are oxidized and removed. More specifically, the temperature of exhaust gas flowing into the NSR catalyst 74 (inlet gas temperature) is detected by the exhaust gas temperature sensor 45, while the after injection from the injectors 23 is being conducted, and the injection amount and injection timing of the after injection are feedback-controlled, so that the exhaust gas temperature reaches a temperature (e.g., 500° C.) required for the end-face clogging elimination treatment. Also, the relationship between the injection amount and injection timing of the after injection, and the temperature of exhaust gas flowing into the NSR catalyst 74, may be obtained by experiment or simulation, and stored in the form of a map in the ROM of the ECU 100, and the after injection may be carried out with the injection amount and injection timing obtained from this map. The end-face clogging elimination treatment is performed with the exhaust gas temperature on the upstream side of the NSR catalyst 74 controlled in this manner; thus, the injectors 23 are the fuel injection valves that are used when performing the end-face clogging elimination treatment (means for supplying fuel for adjusting the inlet temperature of the NSR catalyst 74 (NOx conversion catalyst)).

As a method of estimating the end-face clogging rate in the NSR catalyst 74, a deposit accumulation amount map is created by experiment or simulation, using the engine speed, the amount of fuel injected from the injectors 23 and the exhaust gas temperature as parameters, and the map is stored in the ROM of the ECU 100. Then, the amount of deposits accumulated is obtained based on the deposit accumulation amount map. Also, an end-face clogging rate map used for obtaining the end-face clogging rate in the NSR catalyst 74 from the deposit accumulation amount is created by experiment or simulation, and is stored in the ROM of the ECU 100. Then, the end-face clogging rate of the NSR catalyst 74 is obtained from the end-face clogging rate map. The operation to obtain the end-face clogging rate is performed in the ECU 100. To obtain the end-face clogging rate, a differential pressure sensor may be provided for detecting a pressure difference between the upstream-side pressure and downstream-side pressure of the NSR catalyst 74, while the relationship between the output signal (pressure difference) of the differential pressure sensor and the end-face clogging rate may be stored in the form of a map in the ROM of the ECU 100, and the end-face clogging rate of the NSR catalyst 74 may be obtained from this map (detection of the degree of end-face clogging according to the invention).

In this embodiment, when no request for end-face clogging elimination treatment is generated, the S regeneration treatment and/or the DPF regeneration treatment may be performed, as described later. In this case, the end-face clogging rate in the NSR catalyst 74 is estimated by subtracting the amount of deposits removed from the end face of the NSR catalyst 74 through these treatments (the S regeneration treatment and the DPF regeneration treatment) (for example, by subtracting the amount of deposits obtained from a deposit amount subtraction map created in advance).

Next, the operation to switch exhaust purification treatments as a feature of this embodiment will be described. The operation to switch exhaust purification treatments is to perform control of the inlet temperature of the NSR catalyst 74 through control of fuel injection (more specifically, control of after injection) from the injectors 23, and control of the amount of fuel added from the fuel addition valve 26, according to the degree of end-face clogging of the NSR catalyst 74, when at least one of a request for the DPF regeneration treatment and a request for the S regeneration treatment is generated. In the following, the outline of the operation to switch exhaust purification treatments according to this embodiment will be described.

In the case where the end-face clogging rate of the NSR catalyst 74 is smaller than a predetermined value (the degree of end-face clogging is smaller than a predetermined value), when the amount of PM deposited on the DPF 76 reaches a predetermined threshold value and a request for DPF regeneration treatment is generated, or when the amount of SOx deposited on the NSR catalyst 74 reaches a predetermined value and a request for S regeneration treatment is generated, the fuel injection control of the injectors 23 and the fuel addition control of the fuel addition valve 26 are carried out, so that the requested one(s) of the DPF regeneration treatment and the S regeneration treatment, and the NOx aftertreatment (the Di-Air control), can be performed in parallel. In the following description, this control will be called "first treatment parallel control".

In the case where the end-face clogging rate of the NSR catalyst 74 is equal or larger than the predetermined value (the degree of end-face clogging is equal to or larger than the predetermined value), when the request for DPF regeneration treatment is generated, or when the request for S regeneration treatment is generated, the fuel injection control of the injectors 23 and the fuel addition control of the fuel addition valve 26 are carried out, so that the requested one(s) of the DPF regeneration treatment and the S regeneration treatment, and the end-face clogging elimination treatment, can be performed in parallel. In the following description, this control will be called "second treatment parallel control".

More specifically, as the fuel injection control of the injectors 23 under the first treatment parallel control, the after-injection amount and the after-injection timing are controlled to values that enable the temperature of exhaust gas flowing into the NSR catalyst 74 to be adjusted to a temperature (e.g., 450° C.) suitable for Di-Air control. For example, the relationship between the after-injection amount and the after-injection timing, and the temperature of exhaust gas flowing into the NSR catalyst 74, is obtained by experiment or simulation, and stored in the form of a map in the ROM of the ECU 100. Then, the after-injection amount and the after-injection timing, with which the exhaust gas temperature becomes equal to a temperature suitable for Di-Air control, are obtained from this map.

As the fuel addition control of the fuel addition valve 26 under the first treatment parallel control, when both the request for S regeneration treatment and the request for DPF regeneration treatment are generated, the fuel addition amount is controlled to an amount with which the internal temperature of the NSR catalyst 74 can be increased to a temperature (e.g., 650° C.) at which the S regeneration treatment is feasible, and the temperature of exhaust gas introduced into the DPF 76 can be increased to a temperature (e.g., 600° C.) at which the DPF regeneration treatment is feasible. For example, the relationship among the temperature of exhaust gas flowing into the NSR catalyst 74, the fuel addition amount, the internal temperature of the NSR catalyst 74, and the temperature of exhaust gas introduced into the DPF 76 is obtained by experiment or simulation, and is stored in the form of a map in the ROM of the ECU 100, and the fuel addition amount with which the internal temperature of the NSR catalyst 74 becomes a temperature at which the S regeneration treatment is feasible, and the temperature of exhaust gas introduced into the DPF 76 becomes a temperature at which the DPF regeneration treatment is feasible, is obtained from this map. If a request for DPF regeneration treatment is generated, and no request for S regeneration treatment is generated, the fuel addition control of the fuel addition valve 26 is performed so as to satisfy only the request for DPF regeneration treatment (increase the temperature of exhaust gas introduced into the DPF 76 to a temperature at which the DPF regeneration treatment is feasible). On the other hand, when a request for S regeneration treatment is generated, and no request for DPF regeneration treatment is generated, the fuel addition control of the fuel addition valve 26 is performed so as to satisfy only the request for S regeneration treatment (increase the internal temperature of the NSR catalyst 74 to a temperature at which the S regeneration treatment is feasible).

On the other hand, as the fuel injection control of the injectors 23 under the second treatment parallel control, the after-injection amount and the after-injection timing are controlled to values that enable the temperature of exhaust gas flowing into the NSR catalyst 74 to rise to a temperature (e.g., 500° C.) at which the end-face clogging elimination treatment is feasible. For example, the relationship between the after-injection amount and after-injection timing and the temperature of exhaust gas flowing into the NSR catalyst 74 is obtained by experiment or simulation, and is stored in the form of a map in the ROM of the ECU 100, and the after-injection amount and after-injection timing with which the exhaust gas temperature becomes a temperature at which the end-face clogging elimination treatment is feasible are obtained from this map.

As the fuel addition control of the fuel addition valve 26 under the second treatment parallel treatment, the fuel addition amount is set to a value that is smaller than the fuel addition amount under the first treatment parallel control. This is because, since the temperature of exhaust gas flowing into the NSR catalyst 74 has been elevated as described above, the internal temperature of the NSR catalyst 74 can be increased to a temperature at which the S regeneration treatment is feasible, or the temperature of exhaust gas introduced into the DPF 76 can be increased to a temperature at which the DPF regeneration treatment is feasible, even if the fuel addition amount of the fuel addition valve 26 is set small. In this case too, when a request for S regeneration treatment and a request for DPF regeneration treatment are both generated, the fuel addition control of the fuel addition valve 26 is performed so as to satisfy the request for S regeneration treatment and satisfy the request for DPF regeneration treatment. On the other hand, when a request for DPF regeneration treatment is generated, and no request for S regeneration treatment is generated, fuel addition control of the fuel addition valve 26 is performed so as to satisfy only the DPF regeneration treatment (increase the temperature of exhaust gas introduced into the DPF 76 to a temperature at which the DPF regeneration treatment is feasible). Also, when a request for S regeneration treatment is generated, and no request for DPF regeneration treatment is generated, fuel addition control of the fuel addition valve 26 is performed so as to satisfy only the request for S generation treatment (increase the internal temperature of the NSR catalyst 74 to a temperature at which the S regeneration treatment is feasible).

Thus, in the case where the degree of end-face clogging of the NSR catalyst 74 is equal to or larger than a predetermined value, when at least one of the request for DPF regeneration treatment (request for regeneration of the exhaust purification filter according to the invention) and the request for S regeneration treatment (request for regeneration of the NOx conversion catalyst according to the invention) is generated, the inlet temperature of the NSR catalyst 74, which is adjusted by use of the fuel supplied from the injectors 23, is set to a higher level, and the amount of fuel supplied from the fuel addition valve 26 is set to a smaller value, as compared with the case where the degree of end-face clogging is smaller than the predetermined value. This control is performed by the ECU 100. Thus, a functional portion of the ECU 100 which performs the above-described control (a functional portion that sets the inlet temperature of the NSR catalyst 74 adjusted by the fuel supplied from the injectors 23 to a higher level and sets the amount of fuel supplied from the fuel addition valve 26 to a smaller value, in the case where the degree of end-face clogging of the NSR catalyst 74 is equal to or larger than the predetermined value, as compared with the case where the degree of end-face clogging is smaller than the predetermined value) corresponds to the electronic control unit according to this embodiment.

Figure 3:
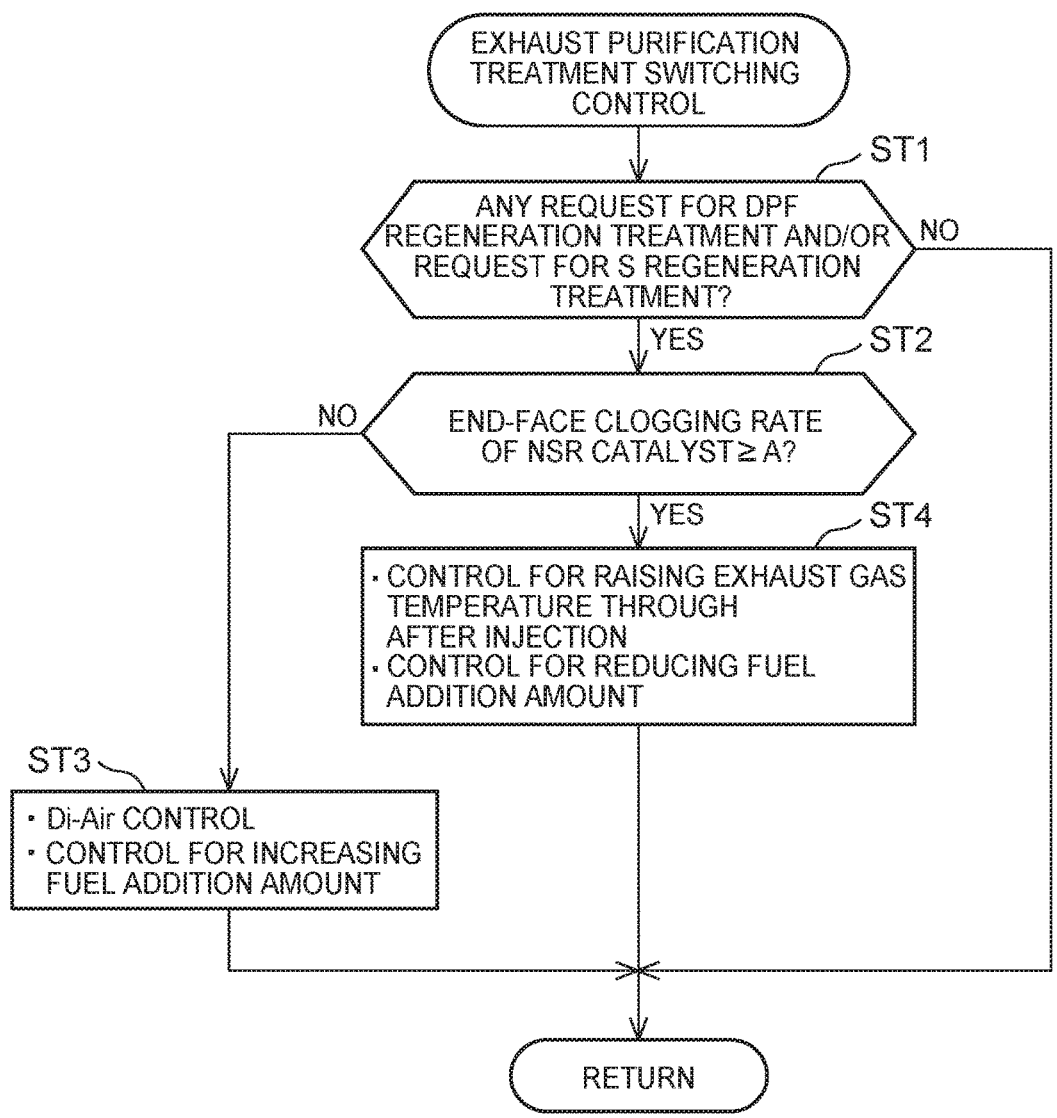
FIG. 3 is a flowchart illustrating the procedure of exhaust purification treatment switching control.

A specific procedure or routine of the exhaust purification treatment switching control will be described with reference to the flowchart of FIG. 3. The routine of this flowchart is repeatedly executed at given time intervals by the ECU 100, after the engine 1 is started.

Initially, in step ST1, it is determined whether there is at least one of a request for DPF regeneration treatment and a request for S regeneration treatment. As described above, the request for DPF regeneration treatment is generated when the amount of PM deposited on the DPF 76 reaches a predetermined threshold value, as described above. Also, the request for S regeneration treatment is generated when the amount of SOx deposited on the NSR catalyst 74 reaches a predetermined threshold value.

When neither of the above requests is generated, and a negative decision (NO) is made in step ST1, the control returns.

On the other hand, when at least one of the request for DPF regeneration treatment and the request for S regeneration treatment is generated, and an affirmative decision (YES) is made in step ST1, the control proceeds to step ST2, in which it is determined whether the end-face clogging rate of the NSR catalyst 74 exceeds a predetermined value A. Namely, it is determined whether the end-face clogging rate of the NSR catalyst 74, which is obtained from the deposit accumulation amount map and the end-face clogging rate map as described above, exceeds the predetermined value A.

When the end-face clogging rate of the NSR catalyst 74 is smaller than the predetermined value A, and a negative decision (NO) is made in step ST2, namely, when at least one of the request for DPF regeneration treatment and the request for S regeneration treatment is generated, but no request for end-face clogging elimination treatment in the NSR catalyst 74 is generated, the control proceeds to step ST3, and the above-described first treatment parallel control is executed. Namely, the after injection from the injectors 23 is not conducted, or the injection amount of the after injection is reduced, for example, so that the exhaust gas temperature is not increased more than necessary, and the temperature of exhaust gas flowing into the NSR catalyst 74 is adjusted to a temperature suitable for Di-Air control. Also, along with the temperature adjustment, the fuel addition amount of the fuel addition valve 26 is controlled to be increased. For example, when the request for DPF regeneration treatment and the request for S regeneration treatment are both generated, the fuel addition amount of the fuel addition valve 26 is controlled to be increased to such an amount that the internal temperature of the NSR catalyst 74 can be increased to a temperature at which the S regeneration treatment is feasible, and the temperature of exhaust gas introduced into the DPF 76 can be increased to a temperature at which the DPF regeneration treatment is feasible. As a result, owing to oxidation reaction of fuel (hydrocarbon) within the NSR catalyst 74, the internal temperature of the NSR catalyst 74 is increased to a temperature at which the S regeneration treatment is feasible, and the temperature of exhaust gas introduced into the DPF 76 is increased to a temperature at which the DPF regeneration treatment is feasible. Also, when the request for DPF regeneration treatment is generated, and no request for S regeneration treatment is generated, the fuel addition control of the fuel addition valve 26 is performed so as to satisfy only the request for DPF regeneration treatment. Also, when the request for S regeneration treatment is generated, and no request for DPF regeneration treatment is generated, the fuel addition control of the fuel addition valve 26 is performed so as to satisfy only the request for S regeneration treatment.

Thus, when the end-face clogging rate of the NSR catalyst 74 is smaller than the predetermined value A, the inlet temperature of the NSR catalyst 74 is set low, and the amount of the fuel added from the fuel addition valve 26 is set large, so that the NOx aftertreatment (Di-Air control) in the NSR catalyst 74, and at least one of the S regeneration treatment of the NSR catalyst 74 and the DPF regeneration treatment of the DPF 76 can be efficiently performed in parallel.

On the other hand, when the end-face clogging rate of the NSR catalyst 74 is equal to or larger than the predetermined value A, and an affirmative decision (YES) is made in step ST2, namely, at least one of the request for the DPF regeneration treatment and the request for S regeneration treatment, and the request for end-face clogging elimination treatment in the NSR catalyst 74, are both generated, the control proceeds to step ST4, and the above-described second treatment parallel control is executed. Namely, the injection amount and injection timing of the after injection from the injectors 23 are controlled (to such values that the temperature of exhaust gas flowing into the NSR catalyst 74 can be increased to a temperature at which the end-face clogging elimination treatment is feasible), and the temperature of exhaust gas flowing into the NSR catalyst 74 is increased. As a result, deposits, etc. as a cause of end-face clogging are oxidized and removed. Along with this treatment, the fuel addition amount of the fuel addition valve 26 is controlled to be reduced, so that the fuel supplied toward the NSR catalyst 74 is reduced. Since the inlet temperature of the NSR catalyst 74 is set to a high level as described above, the internal temperature of the NSR catalyst 74 can be increased to a temperature at which the S regeneration treatment is feasible, and the temperature of exhaust gas introduced into the DPF 76 is sure to be a temperature at which the DPF regeneration treatment is feasible, even if the amount of the fuel added from the fuel addition valve 26 is set small. Thus, the fuel addition is not performed more than necessary. More specifically, when the request for DPF regeneration treatment and the request for S regeneration treatment are both generated, the fuel addition amount of the fuel addition valve 26 is controlled to be reduced to such an amount that the internal temperature of the NSR catalyst 74 can be increased to a temperature at which the S regeneration treatment is feasible, and the temperature of exhaust gas introduced into the DPF 76 can be increased to a temperature at which the DPF regeneration treatment is feasible. When the request for DPF regeneration treatment is generated, and no request for S regeneration treatment is generated, the fuel addition control of the fuel addition valve 26 (the control for reducing the amount of fuel addition) is performed so as to satisfy only the request for DPF regeneration treatment. When the request for S regeneration treatment is generated, and no request for DPF regeneration control is generated, the fuel addition control of the fuel addition valve 26 (the control for reducing the amount of fuel addition) is performed so as to satisfy only the request for S regeneration treatment.

Thus, when the end-face clogging rate of the NSR catalyst 74 is equal to or larger than the predetermined value A, the inlet temperature of the NSR catalyst 74 is set high, and the amount of the fuel added from the fuel addition valve 26 is set small, so that the end-face clogging elimination treatment in the NSR catalyst 74, and at least one of the S regeneration treatment of the NSR catalyst 74 and the DPF regeneration treatment of the DPF 76 can be efficiently performed in parallel.

The processing of these steps ST3, ST4 correspond to adjustment of the inlet temperature of the NOx conversion catalyst and setting of the amount of fuel supplied from the fuel addition valve, which are performed by the electronic control unit according to the embodiment.

The ECU 100 that performs the exhaust purification treatment switching control as described above constitutes the control system for the internal combustion engine according to the embodiment. The control system receives information as to whether there is a request for DPF regeneration treatment (information on the presence or absence of a request for regeneration of the exhaust purification filter) and information as to whether there is a request for S regeneration treatment (information on the presence or absence of a request for regeneration of the NOx conversion catalyst), etc. as input signals. Also, the control system is configured to output fuel injection command signals to the injectors 23 and a fuel addition command signal to the fuel addition valve 26, as output signals.

Figure 4:
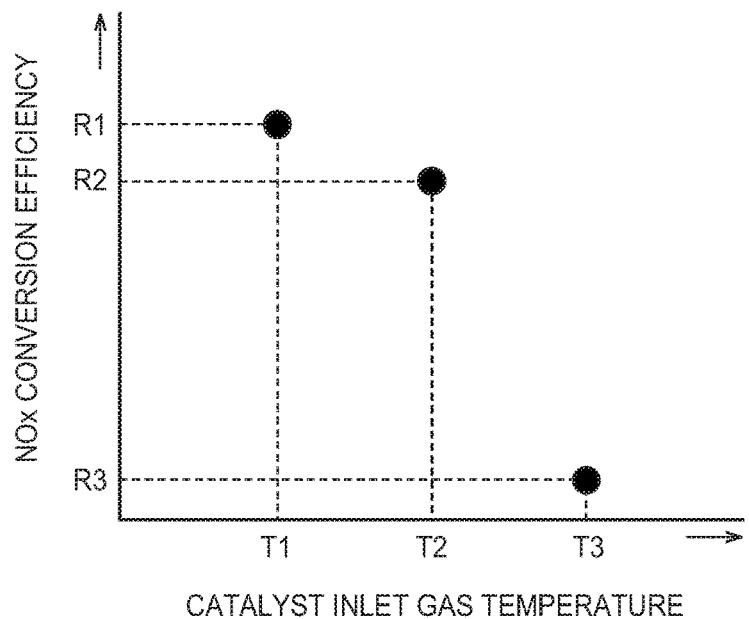
FIG. 4 is a view showing one example of the relationship between the catalyst inlet gas temperature and the NOx conversion efficiency.
Figure 5:
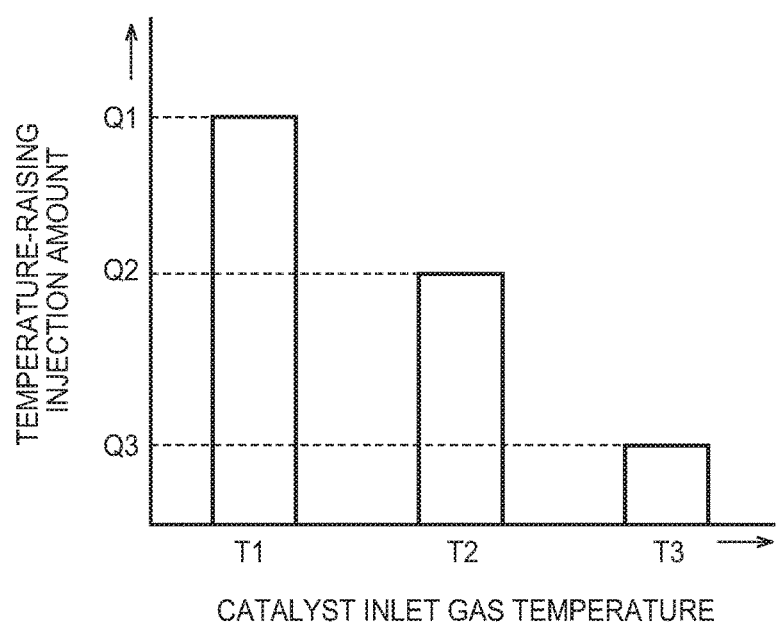
FIG. 5 is a view showing an injection amount setting map indicating the relationship between the catalyst inlet gas temperature and the temperature-raising injection amount.
Figure 6:
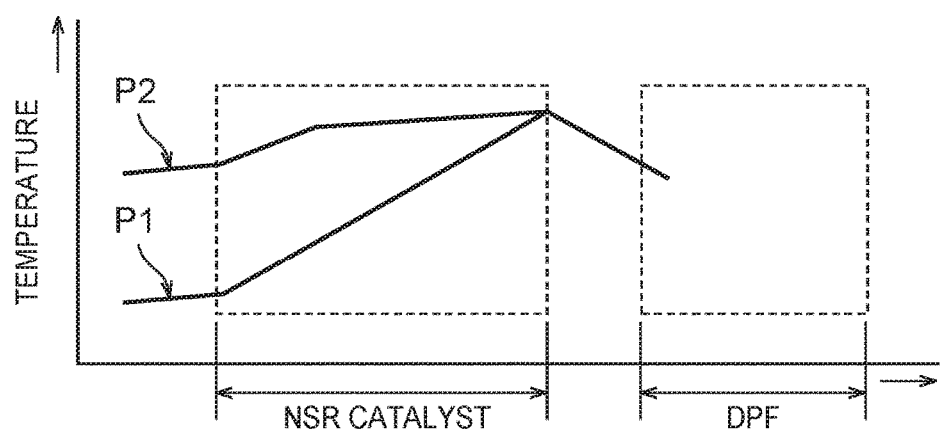
FIG. 6 is a view showing the respective temperatures of a NSR catalyst and a DPF under each of first treatment parallel control and second treatment parallel control.

FIG. 4 shows one example of the relationship between the temperature of exhaust gas introduced into the NSR catalyst 74 (which will be called "catalyst inlet gas temperature"), and the NOx conversion efficiency in the NSR catalyst 74. FIG. 5 is an injection amount setting map indicating the catalyst inlet gas temperature and the fuel addition amount of the fuel addition valve 26 (which will be called "temperature-raising injection amount" (the amount of injection for raising the temperature of the DPF 76)) under each of the first treatment parallel control and the second treatment parallel control. FIG. 6 shows the temperatures of the NSR catalyst 74 and the DPF 76 under each of the first treatment parallel control and the second treatment parallel control when there is a request for DPF regeneration treatment (when no request for S regeneration treatment is generated). In FIG. 6, P1 indicates the respective temperatures of the NSR catalyst 74 and the DPF 76 when the first treatment parallel control is performed. In FIG. 6, P2 indicates the respective temperatures of the NSR catalyst 74 and the DPF 76 when the second treatment parallel control is performed.

Under the first treatment parallel control, the catalyst inlet gas temperature is set to a low value, and the fuel addition amount (temperature-raising injection amount) of the fuel addition valve 26 is set to a large value. Since the catalyst inlet gas temperature is set to a low value (denoted as T1 in FIG. 4 and FIG. 5), a high NOx conversion efficiency (R1) can be obtained through execution of the Di-Air control. Also, in this case, the fuel addition amount (temperature-raising injection amount) of the fuel addition valve 26 is set to a large value (Q1 in FIG. 5); therefore, the temperature of exhaust gas introduced into the DPF 76 can be increased to a temperature at which the DPF regeneration treatment is feasible, as indicated by P1 in FIG. 6.

Under the second treatment parallel control, the catalyst inlet gas temperature is set to a high value, and the fuel addition amount (temperature-raising injection amount) of the fuel addition valve 26 is set to a small value. Since the catalyst inlet gas temperature is set to a high value (denoted as T2 or T3 in FIG. 4 and FIG. 5), clogging at the end face of the NSR catalyst 74 can be favorably eliminated, although NOx conversion efficiency is lowered to R2 or R3. Also, in this case, the fuel addition amount (temperature-raising injection amount) of the fuel addition valve 26 is set to a small value (Q2 or Q3 in FIG. 5); therefore, the temperature of exhaust gas introduced into the DPF 76 is kept at a temperature at which the DPF regeneration treatment is feasible, as indicated by P2 in FIG. 6. Namely, the fuel addition need not be performed more than necessary.

As explained above, in this embodiment, when at least one of the request for DPF regeneration treatment and the request for S regeneration treatment is generated, the control of the inlet temperature of the NSR catalyst 74 through the fuel injection control of the injectors 23 (more specifically, control of after injection), and the control of the fuel addition amount of the fuel addition valve 26 are performed, according to the degree of clogging at the end face of the NSR catalyst 74. Thus, the requested treatment(s) (one or both) of the DPF regeneration treatment of the DPF 76 and the S regeneration treatment of the NSR catalyst 74, and the treatment on the NSR catalyst 74 (the NOx aftertreatment or the end-face clogging elimination treatment) can be efficiently performed in parallel.

In the above-described embodiment, the temperature of exhaust gas introduced into the NSR catalyst 74 is adjusted through control of after injection from the injectors 23. In a modified example, the temperature of exhaust gas introduced into the NSR catalyst 74 is adjusted by controlling the amount of heat recovered at the turbocharger 5 provided in the exhaust system, in addition to the control of after injection. The other configuration and operation of the modified example are substantially identical with those of the above-described embodiment. Thus, the configuration of the turbocharger 5 and the operation to control the amount of heat recovered at the turbocharger 5 will be mainly described.

Figure 7:
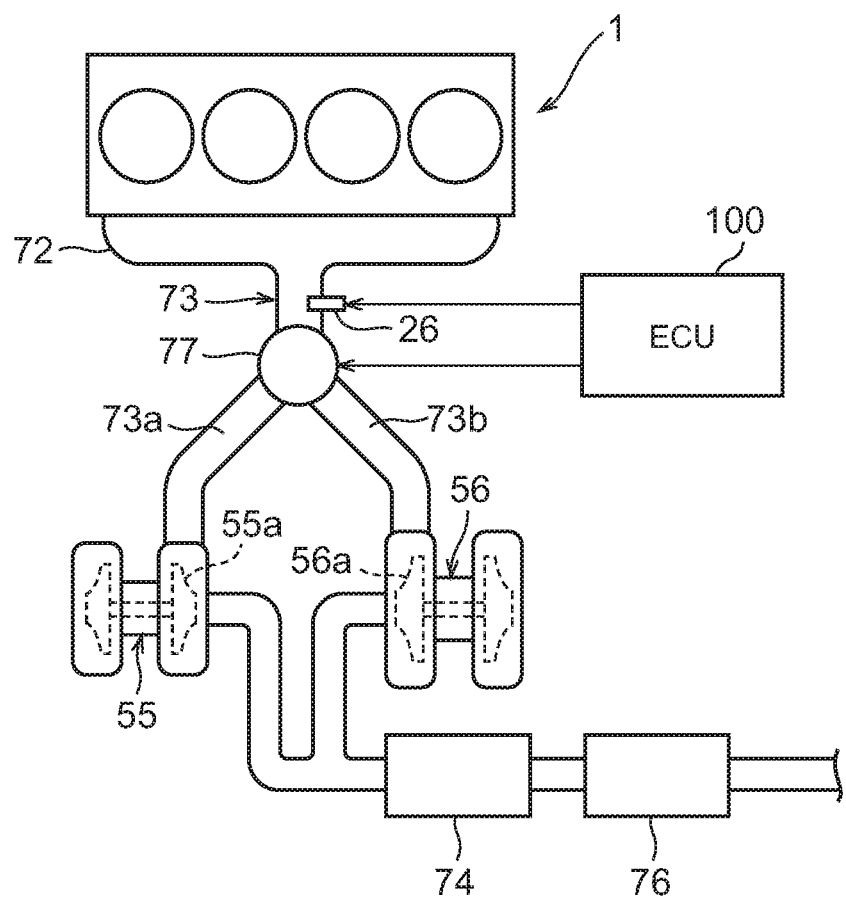
FIG. 7 is a view showing the general configuration of an exhaust system of an engine in a modified example.

Initially, the configuration of the turbocharger 5 in this example will be described. FIG. 7 shows the general configuration of the exhaust system of the engine 1 according to the modified example. As shown in FIG. 7, the turbocharger 5 provided in the engine 1 according to the example is in the form of a parallel-type sequential turbocharger.

More specifically, the exhaust passage 73 of the engine 1 includes a first exhaust passage 73a and a second exhaust passage 73b at the upstream side of the NSR catalyst 74 and the DPF 76.

A turbine wheel 55a of a first turbocharger 55 is disposed in the first exhaust passage 73a. The first turbocharger 55 operates using energy of exhaust gas flowing through the first exhaust passage 73a as a driving source. Also, a turbine wheel 56a of a second turbocharger 56 is disposed in the second exhaust passage 73b. The second turbocharger 56 operates using energy of exhaust gas flowing through the second exhaust passage 73b as a driving source. The physical size of the second turbocharger 56 is larger than that of the first turbocharger 55 (the outside diameter of the turbine wheel 56a is larger than the outside diameter of the turbine wheel 55a). Therefore, when the engine load is small, and the energy of exhaust gas flowing into the turbine wheel 56a of the second turbocharger 56 is small, the turbine wheel 56a of the second turbocharger 56 does not rotate, or it rotates at a low speed; therefore, the amount of work done by the second turbocharger 56 is small, and the amount of energy of exhaust gas recovered is reduced.

The first exhaust passage 73a and the second exhaust passage 73b join together, at a location downstream of the turbine wheels 55a, 56a of the turbochargers 55, 56. In the exhaust passage downstream of the joint, a NSR catalyst 74 and a DPF 76 similar to those of the above embodiment are installed.

A flow regulating valve (one example of flow control device) 77 is provided in a bifurcated portion of the exhaust passage 73 upstream of the turbochargers 55, 56, in which portion the exhaust passage 73 includes the first exhaust passage 73a and the second exhaust passage 73b. The flow regulating valve 77 is controlled by the ECU 100, and is able to adjust the ratio of the flow rate of exhaust gas in the first exhaust passage 73a and the flow rate of exhaust gas in the second exhaust passage 73b. Namely, the flow regulating valve 77 can be switched among a state in which the valve 77 closes the second exhaust passage 73b so that exhaust gas flows only through the first exhaust passage 73a (a state in which exhaust gas flows only through the turbine wheel 55a of the first turbocharger 55), a state in which the valve 77 closes the first exhaust passage 73a so that exhaust gas flows only through the second exhaust passage 73b (a state in which exhaust gas flows only through the turbine wheel 56a of the second turbocharger 56), and a state in which the valve 77 allows exhaust gas to flow through both the first exhaust passage 73a and the second exhaust passage 73b, while adjusting the ratio of the flow rates in these passages 73a, 73b (a state in which exhaust gas flows through both of the turbine wheel 55a of the first turbocharger 55 and the turbine wheel 56a of the second turbocharger 56).

In this example, the fuel addition valve 26 is disposed upstream of the bifurcated portion in which the exhaust passage 73 includes the first exhaust passage 73a and the second exhaust passage 73b. Therefore, when fuel is added from the fuel addition valve 26, the fuel flows toward the NSR catalyst 74 and the DPF 76, even in a condition where exhaust gas flows through only one of the first exhaust passage 73a and the second exhaust passage 73b. Also, the fuel addition valve 26 may be arranged to add fuel into the exhaust manifold 72.

As the basic control of the turbochargers 55, 56 constructed as described above, when the engine load is small or the engine speed is low, supercharging operation is performed by the first turbocharger 55 having the smaller physical size. Thus, the response of the supercharging operation when the engine load is small or the engine speed is low is enhanced (i.e., a turbo lag is reduced). On the other hand, when the engine load is large or the engine speed is high, supercharging operation is performed by the second turbocharger 56 having the larger physical size. Thus, a high boost pressure commensurate with the required torque can be obtained.

Figure 8:
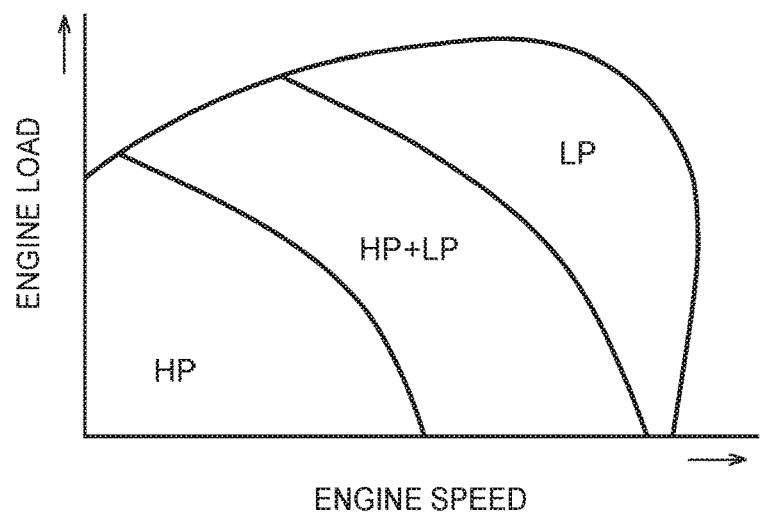
FIG. 8 is a view showing a basic supercharging map in the modified example.

FIG. 8 shows one example of basic supercharging map used for basic control of the turbochargers 55, 56. In the basic supercharging map, "HP" indicates an operating region in which only the first turbocharger 55 is used, namely, an operating region in which exhaust gas flows only through the first exhaust passage 73a. Also, "LP" indicates an operating region in which only the second turbocharger 56 is used, namely, an operating region in which exhaust gas flows only through the second exhaust passage 73b. Also, "HP+LP" indicates an operating region in which both of the first turbocharger 55 and the second turbocharger 56 are used, namely, an operating region in which exhaust gas flows through both of the first exhaust passage 73a and the second exhaust passage 73b.

As shown in the basic supercharging map, when the engine load is small or the engine speed is low, the supercharging operation using only the first turbocharger 55 is performed. Then, as the engine load and the engine speed increase, the engine shifts from the supercharging operation using both the first turbocharger 55 and the second turbocharger 56, to the supercharging operation using only the second turbocharger 56.

As a feature of this example, when there is at least one of the request for DPF regeneration treatment and the request for S regeneration treatment, the manner or pattern of using the turbochargers 55, 56 in each of the case where the end-face clogging rate of the NSR catalyst 74 is equal to or larger than a predetermined value A, and the case where the clogging rate is smaller than the predetermined value A, is different from that of the basic control of the turbochargers 55, 56 as described above. This feature will be specifically described below.

Figure 9:
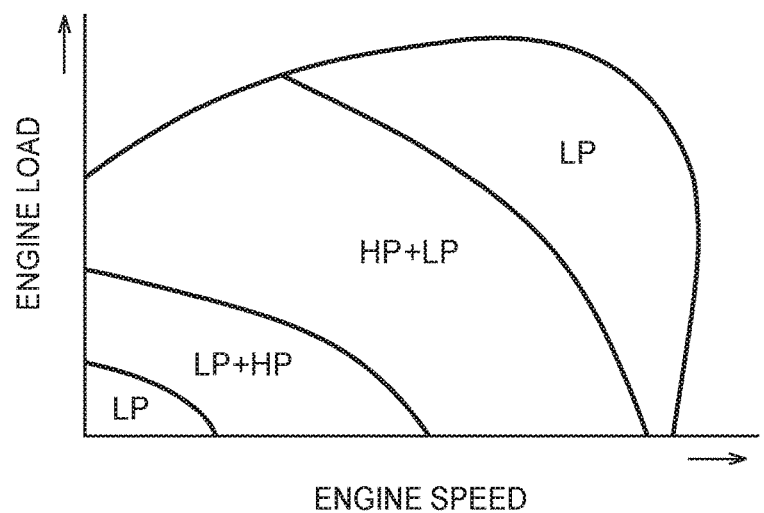
FIG. 9 is a view showing an end-face clogging elimination treatment supercharging map in the modified example.

FIG. 9 is a supercharging map (end-face clogging elimination treatment supercharging map) used in the case where the end-face clogging rate of the NSR catalyst 74 is equal to or larger than the predetermined value A when at least one of the request for DPF regeneration treatment and the request for S regeneration treatment is generated (used in the above-described second treatment parallel control). In this supercharging map, as the engine shifts from an operating region in which both the engine load and the engine speed are low, to an operating region in which both the engine load and the engine speed are high, the manner of using the turbochargers 55, 56 is switched over four modes. In this example, as the engine shifts from the operating region in which both the engine load and the engine speed are low, to the operating region in which both the engine load and the engine speed are high, it shifts from a first supercharging mode to a fourth supercharging mode.

In the first supercharging mode ("LP" on the low-speed and low-load side in FIG. 9), only the second turbocharger 56 is used. Namely, the opening of the flow regulating valve 77 is controlled so as to allow exhaust gas to flow only through the second exhaust passage 73b. In this case, since both the engine load and the engine speed are low, the second turbocharger 56 does not operate even if exhaust gas flows. Therefore, the amount of heat of exhaust gas recovered by the second turbocharger 56 is small. Also, since no exhaust gas flows through the first exhaust passage 73a, no heat of exhaust gas is recovered by the first turbocharger 55. As a result, exhaust gas having a high temperature is allowed to flow into the NSR catalyst 74, and the end-face clogging elimination treatment is favorably performed.

In the second supercharging mode ("LP+HP" in FIG. 9), exhaust gas flows through both the first exhaust passage 73a and the second exhaust passage 73b. In this case, the opening of the flow regulating valve 77 is controlled so that the amount of exhaust gas flowing through the second exhaust passage 73b becomes larger than the amount of exhaust gas flowing through the first exhaust passage 73a. Thus, while the amount of heat of exhaust gas recovered by the second turbocharger 56 is reduced or limited (the amount of heat of exhaust gas recovered is reduced or limited as in the case of the first supercharging mode), the required boost pressure commensurate with the engine load is provided by the first turbocharger 55.

In the third supercharging mode ("HP+LP" in FIG. 9), too, exhaust gas flows through both the first exhaust passage 73a and the second exhaust passage 73b. In this case, the opening of the flow regulating valve 77 is controlled so that the amount of exhaust gas flowing through the first exhaust passage 73a becomes larger than the amount of exhaust gas flowing through the second exhaust passage 73b. Thus, while a sufficient boost pressure is obtained with a high efficiency, by use of the first turbocharger 55, redundant energy is fed into the second turbocharger 56, so that the amount of heat of exhaust gas recovered is reduced or limited, and high-temperature exhaust gas is allowed to flow into the NSR catalyst 74.

In the fourth supercharging mode ("LP" on the high-speed and high-load side in FIG. 9), only the second turbocharger 56 is used. Namely, the opening of the flow regulating valve 77 is controlled so as to allow exhaust gas to flow only through the second exhaust passage 73b. In this case, a boost pressure commensurate with a high engine load is obtained with a high efficiency.

Figure 10:
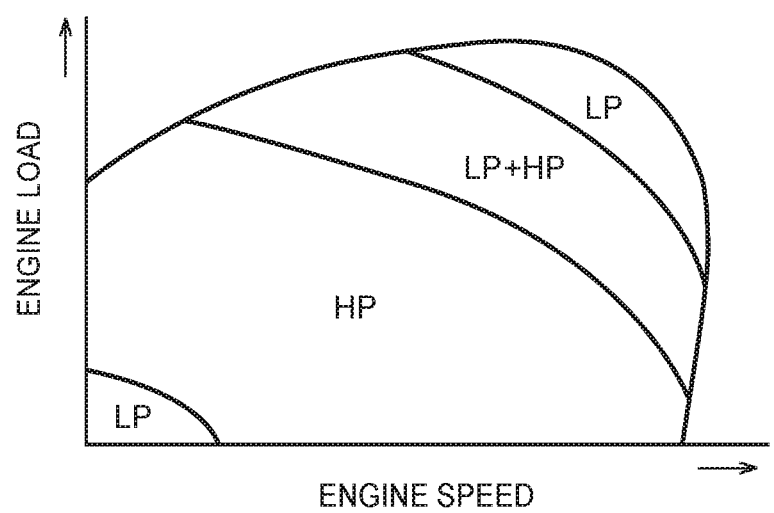
FIG. 10 is a view showing a Di-Air supercharging map in the modified example.

FIG. 10 is a supercharging map (Di-Air control supercharging map) used in the case where the end-face clogging rate of the NSR catalyst 74 is smaller than the predetermined value A when at least one of the request for DPF regeneration treatment and the request for S regeneration treatment is generated (i.e., used in the above-described first treatment parallel control). In this supercharging map, as the engine shifts from an operating region in which both the engine load and the engine speed are low, to an operating region in which both the engine load and the engine speed are high, the manner of using the turbochargers 55, 56 is switched over four modes. In this example, too, as the engine shifts from the operating region in which both the engine load and the engine speed are low, to the operating region in which both the engine load and the engine speed are high, it shifts from a first supercharging mode to a fourth supercharging mode.

In the first supercharging mode ("LP" on the low-speed and low-load side in FIG. 10), only the second turbocharger 56 is used, as in the first supercharging mode in the case where the end-face clogging rate is equal to or larger than the predetermined value A as described above. Namely, the opening of the flow regulating valve 77 is controlled so as to allow exhaust gas to flow only through the second exhaust passage 73b. In this case, the amount of heat of exhaust gas recovered by the second turbocharger 56 is small, as described above. Also, since no exhaust gas flows through the first exhaust passage 73a, no heat of exhaust gas is recovered by the first turbocharger 55.

In the second supercharging mode ("HP" in FIG. 10), only the first turbocharger 55 is used. Namely, the opening of the flow regulating valve 77 is controlled so as to allow exhaust gas to flow only through the first exhaust passage 73a. In this case, a large amount of heat of exhaust gas is recovered by the first turbocharger 55, and exhaust gas having a low temperature is caused to flow into the NSR catalyst 74, so that the temperature of the NSR catalyst 74 is set to a temperature suitable for execution of the Di-Air control. In this case, when the boost pressure becomes higher than necessary, the opening of the intake throttle valve 62 is adjusted so as to adjust the amount of air flowing into the combustion chambers 3.

In the third supercharging mode ("LP+HP" in FIG. 10), the opening of the flow regulating valve 77 is controlled so as to allow exhaust gas to flow through both the first exhaust passage 73a and the second exhaust passage 73b. In this case, the amount of exhaust gas flowing through the second exhaust passage 73b is made larger than the amount of exhaust gas flowing through the first exhaust passage 73a. Thus, the required boost pressure is provided by the first turbocharger 55, while the amount of heat of exhaust gas recovered by the second turbocharger 56 is reduced or limited by the second turbocharger 56.

In the fourth supercharging mode ("LP" on the high-speed and high-load side in FIG. 10), only the second turbocharger 56 is used, as in the fourth supercharging mode in the case where the end-face clogging rate is equal to or larger than the predetermined value A. Namely, the opening of the flow regulating valve 77 is controlled so as to allow exhaust gas to flow only through the second exhaust passage 73b. In this case, a boost pressure commensurate with a high engine load is obtained with a high efficiency.

Thus, in this example, the amount of heat recovered by the turbochargers 55, 56 is controlled, so that the temperature of exhaust gas introduced into the NSR catalyst 74 is adjusted. Therefore, the temperature of exhaust gas introduced into the NSR catalyst 74 can be adjusted with a higher accuracy, and the temperature of the NSR catalyst 74 can be set to a temperature suitable for each of the end-face clogging elimination treatment and the Di-Air control.

Where the end-face clogging elimination treatment supercharging map of FIG. 9 is compared with the Di-AIR control supercharging map of FIG. 10, a region in which exhaust gas flows through the second exhaust passage 73b is larger in the end-face clogging elimination treatment supercharging map, in the operating region in which the engine load is low (when the engine load is equal to or smaller than a predetermined value, according to the embodiment; for example, in the second supercharging mode). Namely, the second turbocharger 56 is used at an increased frequency. As the frequency of use of the second turbocharger 56 increases, the amount of work of the second turbocharger 56 configured with the larger physical size becomes smaller (the amount of work is small since the turbine wheel 56a is less likely or unlikely to rotate), in the operating region in which the engine load is low, and the amount of heat recovered by the turbine wheel 56a of the second turbocharger 56 becomes smaller. Also, since the flow rate of exhaust gas flowing through the first exhaust passage 73a is reduced, the amount of heat recovered by the turbine wheel 55a of the first turbocharger 55 is reduced. Thus, in the end-face clogging elimination treatment supercharging map, the amount of heat recovered by the turbochargers 55, 56 as a whole can be reduced or limited to a small amount. As a result, the temperature of exhaust gas flowing into the NSR catalyst 74 can be increased, and substances that cause clogging of the end face of the NSR catalyst 74 can be effectively oxidized and removed.

Thus, when at least one of the request for regeneration of the DPF 76 (DPF regeneration request) and the request for regeneration of the NSR catalyst 74 (S regeneration request) is generated, in a condition where the engine load is equal to or smaller than a predetermined value, the ratio of the flow rate of exhaust gas flowing through the second exhaust passage 73b to the flow rate of exhaust gas flowing through the first exhaust passage 73a is made larger in the case where the degree of end-face clogging of the NSR catalyst 74 is equal to or larger than a predetermined value, than that in the case when the degree of end-face clogging is smaller than the predetermined value (control of the flow control device is performed by the electronic control unit, according to the embodiment), so that end-face clogging of the NSR catalyst 74 can be effectively eliminated.

The above embodiment and modified example have been described as applied to the engine 1 in which the NSR catalyst 74 as a NOx conversion catalyst is provided in the exhaust system 7. The embodiments may also be applied to an engine including a diesel oxidation catalyst (DOC), in place of or in addition to the NSR catalyst 74.

The fuel injection from the injectors 23 for adjusting the inlet gas temperature of the NSR catalyst 74 is not limited to the after injection, but may be post injection.

The embodiments can be applied to a control system for an internal combustion engine in which a NOx conversion catalyst and an exhaust purification filter are mounted in an exhaust passage, and fuel is added from the upstream side of the catalyst and the filter.

What is claimed is:

1. A control system for an internal combustion engine that includes an exhaust passage, a NOx conversion catalyst, an exhaust purification filter, a fuel addition valve and a fuel injection valve, (i) the NOx conversion catalyst and the exhaust purification filter being arranged in the exhaust passage in order from an upstream side to a downstream side in a direction of flow of exhaust gas in the exhaust passage, (ii) the fuel addition valve being provided in the exhaust passage upstream of the NOx conversion catalyst and being configured to supply a fuel into the exhaust passage from an upstream side of the NOx conversion catalyst, and (iii) the fuel injection valve being configured to supply the fuel into a combustion chamber of the internal combustion engine, the control system comprising:
an electronic control unit configured to:
control supply of the fuel from the fuel addition valve and supply of the fuel from the fuel injection valve;
determine a degree of end-face clogging on an exhaust-gas inflow side of the NOx conversion catalyst;
when a request for regeneration of the exhaust purification filter and/or a request for regeneration of the NOx conversion catalyst is made, and when the degree of end-face clogging is determined to be equal to or larger than a predetermined value, set an inlet temperature of the NOx conversion catalyst to a first higher level by use of the fuel supplied from the fuel injection valve while setting an amount of the fuel supplied from the fuel addition valve to a first value; and
when the request for regeneration of the exhaust purification filter and/or the request for regeneration of the NOx conversion catalyst is made, and when the degree of end-face clogging is determined to be smaller than the predetermined value, set the amount of the fuel supplied from the fuel addition valve to a second value that is larger than the first value without setting the inlet temperature of the NOx conversion catalyst to the first higher level by use of the fuel supplied from the fuel injection valve.

2. The control system according to claim 1, wherein the electronic control unit is further configured to adjust the inlet temperature of the NOx conversion catalyst with the fuel injection valve by adjusting a fuel injection timing and a fuel injection amount in a period from an expansion stroke to an exhaust stroke of the internal combustion engine.

3. The control system according to claim 1, wherein:
the internal combustion engine further includes a first turbocharger, a second turbocharger, and a flow control device;
the exhaust passage includes a first exhaust passage and a second exhaust passage, on the upstream side of the NOx conversion catalyst;
the first turbocharger is provided in the first exhaust passage;
the second turbocharger is provided in the second exhaust passage, the second turbocharger having a larger physical size than the first turbocharger;
the flow control device is provided in the exhaust passage and is configured to adjust a ratio of a first flow rate of the exhaust gas flowing through the first exhaust passage to a second flow rate of the exhaust gas flowing through the second exhaust passage; and
the electronic control unit is further configured to control the flow control device so as to make the ratio of the second flow rate to the first flow rate larger when the degree of end-face clogging is determined to be equal to or larger than the predetermined value, than the ratio of the second flow rate to the first flow rate when the degree of end-face clogging is determined to be smaller than the predetermined value, when the request for regeneration of the exhaust purification filter and/or the request for regeneration of the NOx conversion catalyst is made in a condition where a load of the internal combustion engine is equal to or smaller than a prescribed value.

4. The control system according to claim 1, wherein the electronic control unit is further configured to intermittently execute supply of the fuel from the fuel addition valve at intervals of several seconds, when the degree of end-face clogging is determined to be smaller than the predetermined value, when the request for regeneration of the exhaust purification filter and/or the request for regeneration of the NOx conversion catalyst is made.

5. A control method for controlling an internal combustion engine that includes an exhaust passage, a NOx conversion catalyst, an exhaust purification filter, a fuel addition valve and a fuel injection valve, (i) the NOx conversion catalyst and the exhaust purification filter being arranged in the exhaust passage in order from an upstream side to a downstream side in a direction of flow of exhaust gas in the exhaust passage, (ii) the fuel addition valve being provided in the exhaust passage upstream of the NOx conversion catalyst and being configured to supply a fuel into the exhaust passage from an upstream side of the NOx conversion catalyst, and (iii) the fuel injection valve being configured to supply the fuel into a combustion chamber of the internal combustion engine, the control method comprising:

controlling, via an electronic control unit, a supply of the fuel from the fuel addition valve and a supply of the fuel from the fuel injection valve;

determining, via the electronic control unit, a degree of end-face clogging on an exhaust-gas inflow side of the NOx conversion catalyst;

when a request for regeneration of the exhaust purification filter and/or a request for regeneration of the NOx conversion catalyst is made, and when the degree of end-face clogging is determined to be equal to or larger than a predetermined value, the electronic control unit (A) setting an inlet temperature of the NOx conversion catalyst to a first higher level by use of the fuel supplied from the fuel injection valve while setting an amount of the fuel supplied from the fuel addition valve to a first value; and when the request for regeneration of the exhaust purification filter and/or the request for regeneration of the NOx conversion catalyst is made, and when the degree of end-face clogging is determined to be smaller than the predetermined value, the electronic control unit setting the amount of the fuel supplied from the fuel addition valve to a second value that is larger than the first value without setting the inlet temperature of the NOx conversion catalyst to the first higher level by use of the fuel supplied from the fuel injection valve.

6. The method according to claim 5, wherein the electronic control unit adjusts the inlet temperature of the NOx conversion catalyst with the fuel injection valve by adjusting a fuel injection timing and a fuel injection amount in a period from an expansion stroke to an exhaust stroke of the internal combustion engine.

7. The method according to claim 5, in which the internal combustion engine further includes a first turbocharger, a second turbocharger, and a flow control device; the exhaust passage includes a first exhaust passage and a second exhaust passage, on the upstream side of the NOx conversion catalyst; the first turbocharger is provided in the first exhaust passage; the second turbocharger is provided in the second exhaust passage, the second turbocharger having a larger physical size than the first turbocharger; and the flow control device is provided in the exhaust passage and is configured to adjust a ratio of a first flow rate of the exhaust gas flowing through the first exhaust passage to a second flow rate of the exhaust gas flowing through the second exhaust passage, the method further comprising:

controlling, via the electronic control unit, the flow control device so as to make the ratio of the second flow rate to the first flow rate larger when the degree of end-face clogging is determined to be equal to or larger than the predetermined value, than the ratio of the second flow rate to the first flow rate when the degree of end-face clogging is determined to be smaller than the predetermined value, when the request for regeneration of the exhaust purification filter and/or the request for regeneration of the NOx conversion catalyst is made in a condition where a load of the internal combustion engine is equal to or smaller than a prescribed value.

8. The method according to claim 5, wherein the electronic control unit intermittently executes the supply of the fuel from the fuel addition valve at intervals of several seconds, when the degree of end-face clogging is determined to be smaller than the predetermined value, when the request for regeneration of the exhaust purification filter and/or the request for regeneration of the NOx conversion catalyst is made.

* * * * *